UNITED STATES PATENT OFFICE.

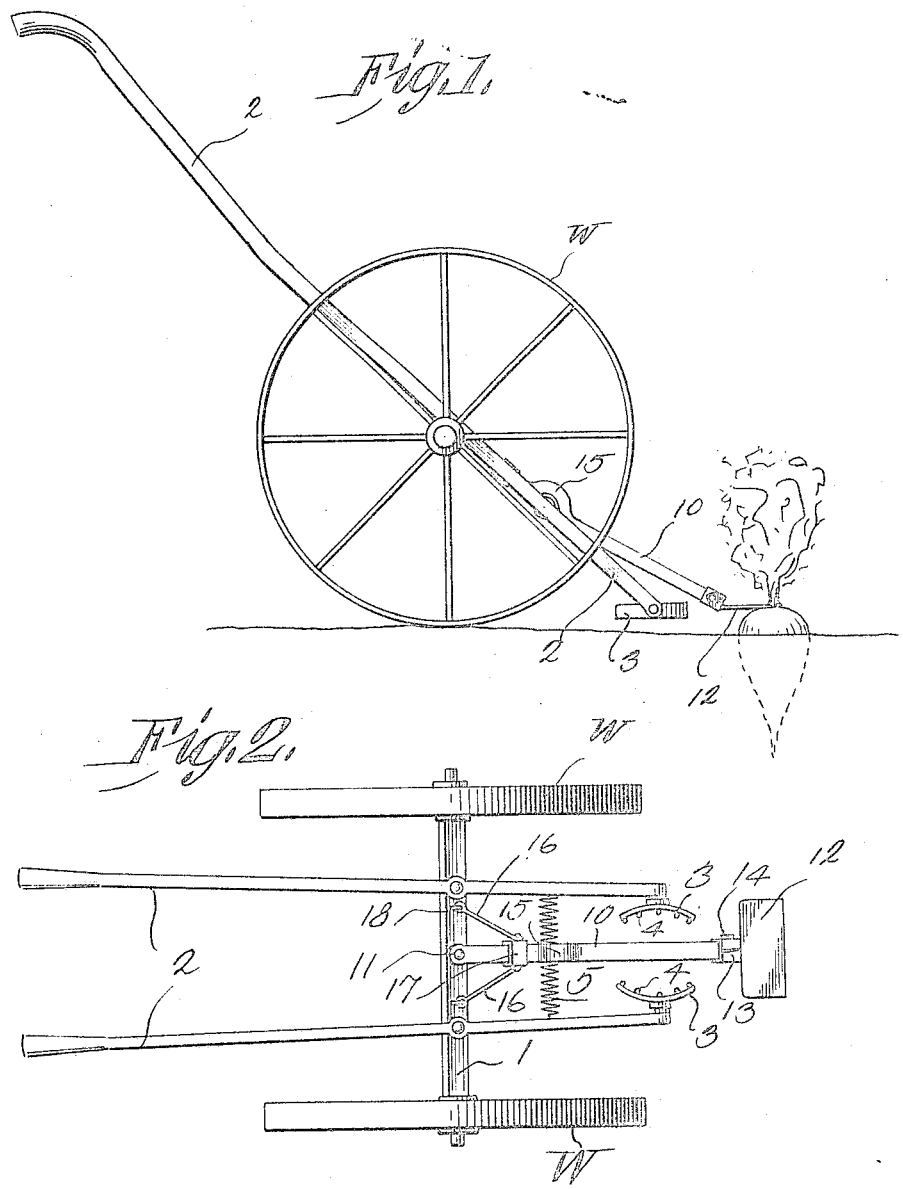

JOHN R. SCHMITT, OF McHENRY, ILLINOIS.

BEET-TOPPER.

1,288,224.  Specification of Letters Patent.  Patented Dec. 17, 1918.

Application filed April 25, 1918. Serial No. 230,771.

*To all whom it may concern:*

Be it known that I, JOHN R. SCHMITT, a citizen of the United States, residing at McHenry, in the county of McHenry and State of Illinois, have invented certain new and useful Improvements in Beet-Toppers, of which the following is a specification.

This invention relates to agricultural implements, and more particularly to beet toppers.

The object of the invention is to provide a simple and efficient beet topper for use in connection either with or without a beet puller.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of an implement constructed in accordance with this invention and shown in the act of topping a beet, and Fig. 2 is a plan view thereof.

In the embodiment illustrated, a wheel supported structure is shown comprising ground wheels W revolubly mounted on an axle 1, the body portion of which is preferably angular in cross section and to which are pivoted intermediately of their ends, a pair of handles 2, the front ends of which carry beet pullers 3 which may be of any suitable or desired construction, being here shown in the form of arcuate strips, having prongs 4 for gripping the beets, a coiled spring 5 connecting the front ends of the handle members 2 so that it exerts its tension to move the members 3 toward each other.

By connecting the handles 2 with the axle 1, the axle may be turned to position the pullers carried by the front ends of said handles at any desired height relative to the surface over which the implement is being moved. While this device is here shown applied to a hand implement, obviously it is not to be limited to such a structure, but may be mounted equally well on a tractor or horse drawn implement.

The topper constituting this invention comprises a bar 10 preferably angular in cross section and which is of a length to project at its front end beyond the beet puller members 3, the rear end thereof being secured to the axle 1 between the connections of the arms 2 therewith as is shown at 11. Secured to the front end of the bar 10 is a cutting knife 12, here shown in the form of a rectangular blade having a socket 13 extending at an oblique angle at its rear edge and which is designed to receive the front end of the bar 10 and to be connected therewith by means of a set screw 14.

The bar 10 is provided with an outwardly bowed portion 15 which is positioned over the coiled spring 5 which connects the puller members so as to prevent interference therewith, and brace rods or links 16 are connected at one end with the axle 1 and at their other ends with a combined guide and support 17. The rods 16 are connected at their opposite ends with the slide 17 and with the axle 1 by eye bolts 18 to permit the vertical movement of the bar 10 so that should the device be used for topping high beets, the blade or knife 12 may rest on the top of the beet as shown in Fig. 1, while the gripper carrying portion of the handles 2 may be disposed adjacent the ground without in any way interfering with the operation of the topper.

In the use of this improved topper, the structure on which it is mounted is moved forward with the wheels W straddling the row of beets to be topped, and the operator by grasping the handles 2 pushes the implement forward, the knife 12 having been adjusted in the desired position for topping beets. It is of course, understood that the raising or lowering of the handles 2 will operate to raise or lower the topper, as this movement of the handles controls the movement of the axle 1 which carries the topper.

When used in connection with a beet puller, after the topper 12 cuts the top from the beet, the gripper members 3 follow and grasp the beet and lift it from the ground, and any form of lifting or pulling mechanism may be employed, that shown not being necessarily used.

The foregoing description and the drawings have reference to what may be considered the preferred or approved form of my invention. It is to be understood that I may make such changes in construction and arrangement and combination of parts, materials, dimensions, *et al.*, as may prove expedient and fall within the scope of the claimed invention.

Having thus fully described my invention, what I claim as new and desire to secure by Letters Patent, is:—

1. A beet topper comprising a wheel supported structure, a bar secured at one end to said structure, a cutting knife carried by said bar, a slide mounted on said bar, and braces connecting said slide with said structure, said braces having a loose connection with the structure and with the slide.

2. A beet topper comprising a wheel supported structure including an axle, means connected to rotate said axle independently of said wheels, a bar secured at one end to said axle and extending forwardly and provided at its front end with a cutting knife, and braces connecting said bar with said axle.

3. A beet topper comprising a wheel supported structure including an axle, means connected to rotate said axle independently of said wheels, a bar secured at one end to said axle and extending forwardly and provided at its front end with a cutting knife, a slide mounted on said bar, and braces connecting said slide with said axle.

4. A beet topper comprising a wheel supported structure including an axle, means connected to rotate said axle independently of said wheels, a bar secured at one end to said axle and extending forwardly and provided at its front end with a cutting knife, a slide mounted on said bar, and braces connecting said slide with said axle, said braces having a loose connection with the axle and with the slide.

In testimony whereof I affix my signature in presence of two witnesses.

JOHN R. SCHMITT.

Witnesses:
  MARTIN B. SCHMITT,
  ESTHER STOFFEL.